United States Patent Office 2,734,077
Patented Feb. 7, 1956

2,734,077

PRODUCTION OF CYCLO-HEXA-1,4-DIENE-1,4-DICARBOXYLIC ACID

Peter Smith, Norton-on-Tees, England, assignor to Imperial Chemical Industries Limited, a corporation of Great Britain No Drawing. Application April 2, 1954,
Serial No. 420,750

Claims priority, application Great Britain May 1, 1953

7 Claims. (Cl. 260—514)

This invention relates to the production of cyclohexa-1,4-diene-1,4-dicarboxylic acid.

It has already been proposed to dehydrate dimethyl cyclohexane-2,5-diol-1,4-dicarboxylate in the liquid phase using dehydrating agents such as acetic anhydride, formic acid, zinc chloride, potassium hydrogen sulphate, hydrochloric acid, sulphuric acid, sulphonic acids such as p-toluene sulphonic acid or alumina. It has also been proposed to carry out this dehydration by contacting the diol in the vapour phase with a dehydration catalyst, such as alumina, alumina-silica gels, activated clays, zinc oxide, basic aluminium phosphate, and the blue oxide of tungsten.

The present invention provides an improved process for converting cyclohexane-2,5-diol-1,4-dicarboxylic acid or acid esters or di-esters thereof to cyclohexa-1,4-diene-1,4-dicarboxylic acid.

Thus, according to the present invention, there is provided a process for the production of cyclohexa-1,4-diene-1,4-dicarboxylic acid which comprises the steps of contacting cyclohexane-2,5-diol-1,4-dicarboxylic acid or an acid ester or di-ester thereof with a hydroxide or an alkoxide of an alkali metal or an alkaline earth metal at an elevated temperature of 100° to 150° C. and subsequently neutralising the product.

In the process of the present invention it is preferred to use an alkali metal hydroxide, and, in particular, sodium hydroxide. This is preferably employed in the form of an aqueous solution having a concentration within the range 1N to 5N.

It is also possible to use alkaline earth metal hydroxides, viz., the hydroxides of calcium, strontium and barium, although, when operating in this manner, reaction is slower than when using an alkali metal hydroxide.

If desired, an alkoxide may be employed in place of a hydroxide. Thus, sodium derivatives of alcohols having from 1 to 4 carbon atoms may be used in place of sodium hydroxide in the process.

When using an alkali metal hydroxide or alkoxide in the process of the present invention, it is desirable for at least two moles, and at most ten moles to be used per mole of cyclohexane-2,5-diol-1,4-dicarboxylic acid or acid ester or di-ester thereof. When using an alkaline earth metal hydroxide, it is desirable for at least one mole and at most ten moles to be used per mole of cyclohexane-2,5-diol-1,4-dicarboxylic acid or acid ester or di-ester thereof.

The process of the present invention is preferably carried out in the presence of a solvent, the preferred solvent being water. If desired, aliphatic alcohols containing one to four carbon atoms may be used as solvent. When using an alcohol solvent and a hydroxide or when using an alkoxide, the product may comprise, in addition to cyclohexa-1,4-diene-1,4-dicarboxylic acid, minor amounts of acid ester and di-ester derived from this acid.

The process of the present invention is carried out at temperatures of 100° C. to 150° C., since, above 150°, undesirable side reactions occur. For example, at 200° C. the major reaction is the conversion of 3 molecules of dimethyl cyclohexane-2,5-diol-1,4-dicarboxylate to 2 molecules of terephthalic acid and 1 molecule of hexahydroterephthalic acid. At the same time, a decarboxylation reaction takes place which results in the conversion of some of the terephthalic acid into benzoic acid.

The optimum duration of the present reaction is determined by the temperature of operation and the nature and concentration of the hydroxide or alkoxide employed.

The product obtained by treating cyclohexane-2,5-diol-1,4-dicarboxylic acid or an acid ester or di-ester thereof with a hydroxide of an alkali metal or an alkaline earth metal is an alkali metal or alkaline earth metal salt of a cyclohexa-1,4-diene-1,4-dicarboxylic acid; as stated above, there may also be present an acid ester and di-ester of this acid. The corresponding free acid may be liberated by treating the alkali metal or alkaline earth metal salt with, for example, a dilute mineral acid such as hydrochloric acid.

The present invention provides an important step in the conversion of a di-alkyl succinate to terephthalic acid. Thus, a di-alkyl succinate may be condensed by means of a sodium or sodium alkoxide catalyst to give a disodium derivative of a di-alkyl cyclohexa-1,4-diene-2,5-diol-1,4-dicarboxylate. This may be hydrogenated and hydrolysed to give cyclohexane-2,5-diol-1,4-dicarboxylic acid or an acid ester or di-ester thereof which may then be converted by the process of the present invention to cyclohexa-1,4-diene-1,4-dicarboxylic acid. The cyclohexa-1,4-diene-1,4-dicarboxylic acid may then be dehydrogenated or oxidised to give terephthalic acid.

*Example 1*

69 grams of dimethyl cyclohexane-2,5-diol-1,4-dicarboxylate were heated in an autoclave with 48 grams of sodium hydroxide and 360 grams of water for 8 hours at a temperature of 150° C. From the product after acidification 31.8 grams of cyclohexa-1,4-diene-1,4-dicarboxylic acid were isolated, this corresponding to a yield of this compound of 63%.

*Example 2*

11.6 grams (0.05 mol.) of dimethyl cyclohexane-2,5-diol-1,4-dicarboxylate and 5.4 grams (0.1 mol.) of sodium methoxide were dissolved in 250 mls. of methanol. On standing overnight at room temperature a white precipitate was formed; the amount of this increased on heating the mixture to 50° C. The precipitate was filtered off, acidified with hydrochloric acid and re-filtered. The product was shown to be cyclohexa-1,4-diene-1,4-dicarboxylic acid. 3.6 grams of this solid were formed corresponding to a yield of 43%.

I claim:

1. A process for the production of cyclohexa-1,4-diene-1,4-dicarboxylic acid which comprises the steps of contacting a compound having a structure:

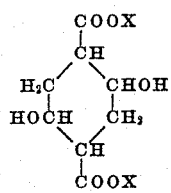

where X is selected from the group consisting of hydrogen and alkyl with a dehydrating agent selected from the group consisting of hydroxides and alkoxides of alkali metals and alkaline earth metals at a temperature of 100 to 150° C. and subsequently neutralising the product.

2. A process for the production of cyclohexa-1,4-diene- 1,4-dicarboxylic acid which comprises the steps of contacting a compound having a structure:

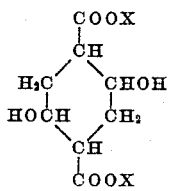

where X is selected from the group consisting of hydrogen and alkyl with aqueous sodium hydroxide at a temperature of 100 to 150° C. and subsequently neutralising the product.

3. A process as claimed in claim 2 in which the sodium hydroxide solution has a concentration within the range of 1 N to 5 N.

4. A process as claimed in claim 2 in which the molar ratio of sodium hydroxide to cyclohexane derivative is from 2:1 to 10:1.

5. A process for the production of cyclohexa-1,4-diene-1,4-dicarboxylic acid which comprises the steps of contacting a compound having a structure:

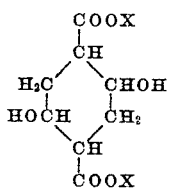

where X is selected from the group consisting of hydrogen and alkyl with an alkaline earth metal hydroxide at a temperature of 100 to 150° C., the molar ratio alkaline earth metal hydroxide to cyclohexane derivative being from 1:1 to 10:1, and subsequently neutralising the product.

6. A process for the production of cyclohexa-1,4-diene-1,4-dicarboxylic acid which comprises the steps of contacting a compound having a structure:

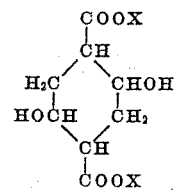

where X is selected from the group consisting of hydrogen and alkyl with an alkali metal alkoxide derived from an alcohol containing at most four carbon atoms at a temperature of 100 to 150° C., the molar ratio alkali metal alkoxide to cyclohexane derivative being from 2:1 to 10:1, and subsequently neutralising the product.

7. A process for the production of cyclohexa-1,4-diene-1,4-dicarboxylic acid which comprises the steps of contacting a compound having a structure:

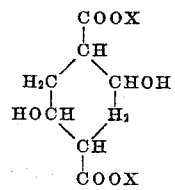

where X is selected from the group consisting of hydrogen and alkyl in the presence of a solvent selected from water and aliphatic alcohols containing at most four carbon atoms with a dehydrating agent selected from the group consisting of hydroxides and alkoxides of alkali metals and alkaline earth metals at a temperature of 100° to 150° C. and subsequently neutralising the product.

References Cited in the file of this patent
FOREIGN PATENTS
338,815    France _____ May 25, 1904